United States Patent [19]
Ko

[11] Patent Number: 6,005,484
[45] Date of Patent: Dec. 21, 1999

[54] WARNING DEVICE OF OVERLOAD OR OVERHEAT FOR THE ELECTRIC CORDS, CABLES, SOCKETS

[76] Inventor: Frank Ko, 2F-3, No. 6, Ta An West Street, Taichung, Taiwan

[21] Appl. No.: 08/986,631

[22] Filed: Dec. 8, 1997

[51] Int. Cl.⁶ .................................................. G08B 21/00
[52] U.S. Cl. ........................ 340/662; 340/653; 340/584; 337/265; 361/56; 374/162; 116/207
[58] Field of Search .................................. 340/662, 653, 340/656, 655, 640, 630, 584; 337/28, 265, 243; 361/56, 57; 374/162, 161, 174; 116/207

[56] References Cited

U.S. PATENT DOCUMENTS

| | | | |
|---|---|---|---|
| 3,877,411 | 4/1975 | MacDonald | 116/114.5 |
| 4,016,762 | 4/1977 | Payne | 73/358 |
| 4,170,190 | 10/1979 | Warner | 116/206 |
| 4,325,254 | 4/1982 | Svacina et al. | 73/356 |
| 4,459,046 | 7/1984 | Spirg | 374/162 |
| 4,907,118 | 3/1990 | Hames | 340/662 |
| 5,076,708 | 12/1991 | Pierson | 374/144 |

*Primary Examiner*—Jeffery A. Hofsass
*Assistant Examiner*—Anh La
*Attorney, Agent, or Firm*—Pro-Techtor International Services

[57] ABSTRACT

A warning device of overload or overheat for the electric cords, cables, sockets comprisng with a, or some warning strips having evident colors at proper location on a PVC power cord, and having heat-sensing layers applied on the warning strips, whereby, when the power cord is overloaded with a large current, the copper wire thereof is gradually heated, and temperature on the PVC power cord is raised accordingly, then the dark heat-sensing layers become transparent gradually, and the colors of the sensing strips appear, so that an effect of detecting whether the electric cord is in overload, or overheat can be achieved.

4 Claims, 3 Drawing Sheets

WARNING DEVICE OF OVERLOAD OR OVERHEAT FOR THE ELECTRIC CORDS, CABLES, SOCKETS

BACKGROUND OF THE INVENTION

1. Field of the Invention

The present invention is related to a warning device of overload or overheat for the electric cords, cables, sockets, and especially to a warning device capable of detecting overload or overheat of the electric cords, cables, sockets.

2. Description of the Prior Art

The indoor fire acceident is mostly incurred by firing of electric cord which is usually happened by a long time of overload, if such overloading circustance is not cut off by the Circuit Breaker, or Fuse to an "OFF" status, the temperature on the PVC power cord will be raising up, and then this high temperature will melt the PVC, and make the copper wire bare, then the circuit will be in "SHORT" to cause a fire very soon. Moveover, a normal PVC power cord is marked with the values of a rated voltage and a rated current for reference in using thereof. However, the consumer normally has no idea or concept about these electric specification, when the PVC power cord is softened by the high temperature due to the large loading current which is not observable , a normal consumer does not know or sense that this is a foreboding of causing a fire on the PVC power cord.

SUMMARY OF THE INVENTION

In view of this, the present invention is to privide the warning device of overload or overheat for the electric cords, cables, sockets to the above-mentioned disadvantage which is residing in the conventional electric cords, cables and sockets.

The primary object of the present invention is to provide a warning device of overload or overheat for the electric cords which a consumer can easily observe whether the electric cord is in overload while connected with a electric appliance without using any complicated detecting instruments, such mode of warning takes advantage of a function that a dark heat-sensing layer will turn to transparent gradually when it is heated and a warning strip under the heat-sensing layer will appear thereafter , a consumer can thereby be aware of whether the electric cord is in overload, or overheated with eyes easily, so that a warning function can be achieved.

If the overload or overheat on a power cord of the present invention has been removed, the temperature will be reduced, the dark heat-sensing layer will turn its color from transparent to the original color to cover the warning strip again, so that the warning device can be reused again and again, this is another advantage of the present invention.

In order to reach above objects, the present invention will be described hereafter with the accompanying drawings and detailed description of the prefered embodiment as attached.

DETAILED DESCRIPTION OF THE PREFERED EMBODIMENT

Figure 1:
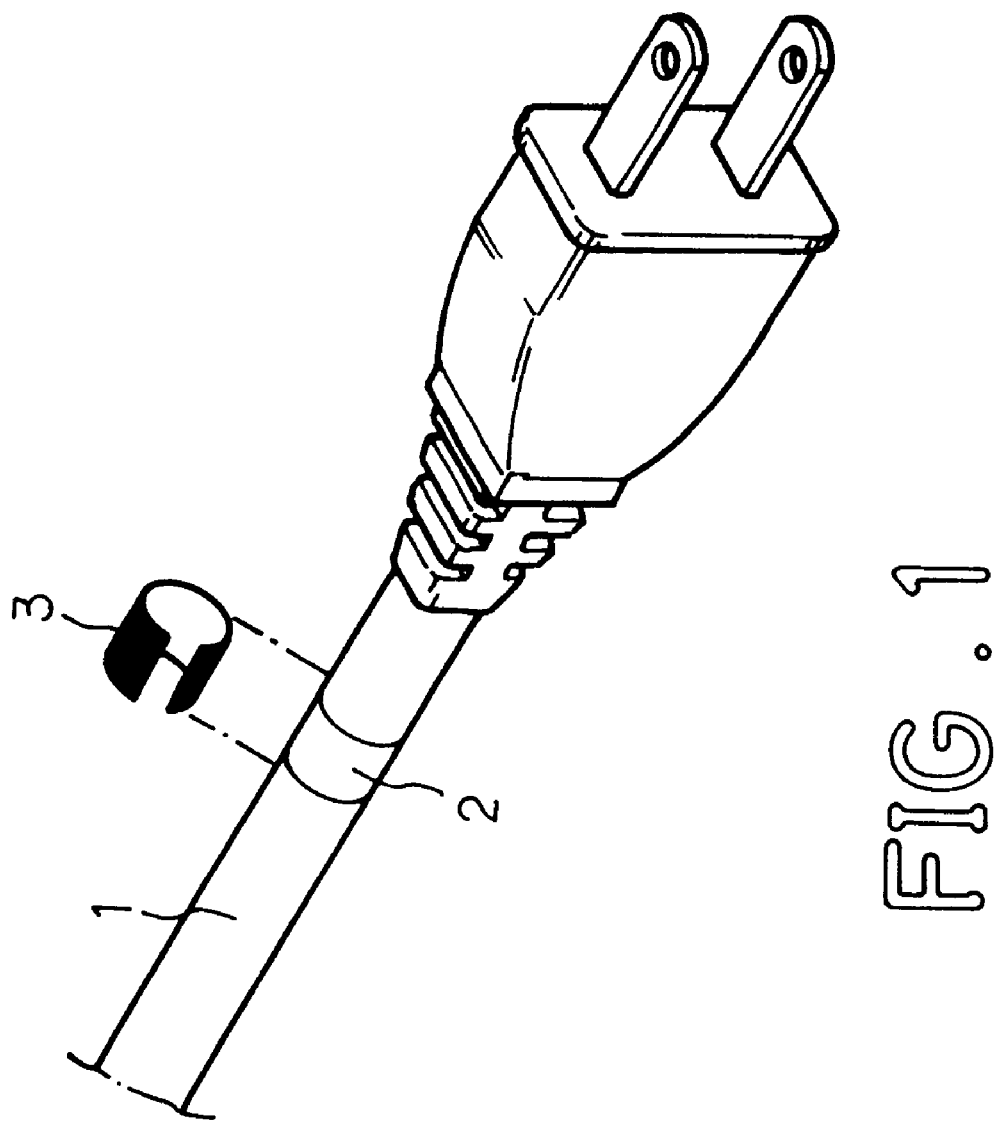
FIG. 1 is a simplified view of the present invention.

As shown in FIG. 1, the present invention is provided with a plurality of warning strips 2 having an evident colors at proper location on the PVC power cord 1, a dark heat-sensing layer 3 is coated on each of the warning strips.

Figure 2:
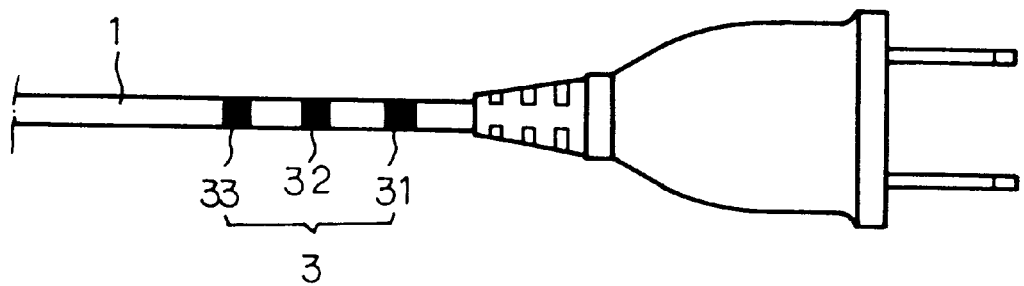
FIG. 2 is a schematic view of the first embodiment of dark heat-sensing layer.

As shown in FIG. 2, 5, in the present invention, the warning strips 2 on the PVC power cord can be coated with some different colors, the heat-sensing layer 3 covering on the warning strips 2 of the PVC power cord 1 can have their respective rated changing temperature, the level of changing can be set by practical application.

(1) The first heat-sensing layer 31. Yellow warning strip 21. Color changing temperature is set in about 40° C.

(2) The second heat-sensing layer 32. Red warning strip 22. Color changing temperature is set in about 60° C.

(3) The third heat-sensing layer 33. Fluorescent warning strip 23. Color changing temperature is set in about 80° C.

Figure 3:
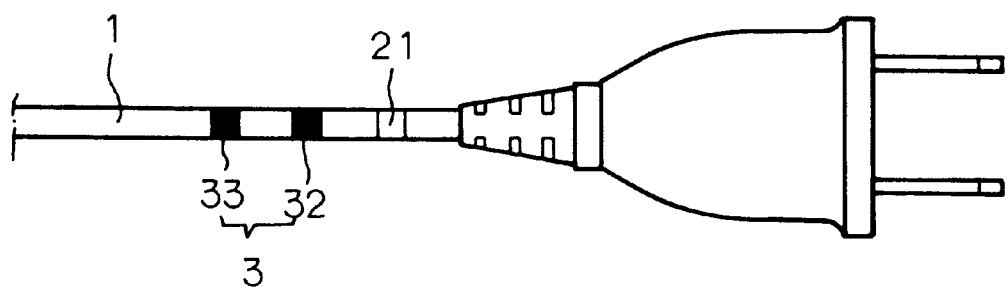
FIG. 3 is a schematic view of the second embodiment of yellow warning strip.

FIG. 2 to 5 shown that if the PVC power cord 1 of the present invention is overloaded with a large current when in using, then the copper wire thereof is gradually heated and temperature on the PVC will be raised accordingly, when the temperature on the PVC is raised to the set temperature changing as first heat-sensing layer 31, the latter will become transparent gradually, then the yellow warning strip 21 appears, just as is shown in FIG. 3 by then the temperature on the power cord 1 is about 40° C.

Figure 4:
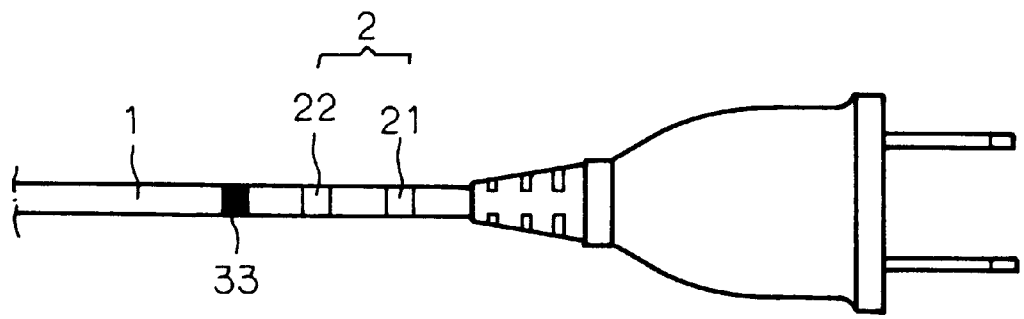
FIG. 4 is a schematic view of the third embodiment of red warning strip.

Further, when the overload status is not yet eliminated, the temperature will be keeping on rising, the temperature on the PVC is reached to the sensing level of temperature the second heat-sensing layer 32, the latter will become tranasparent gradually too, and the red warning strip 22 appears, just as is shown in FIG. 4 by then the temperature on the power cord 1 is about 60° C.

Figure 5:
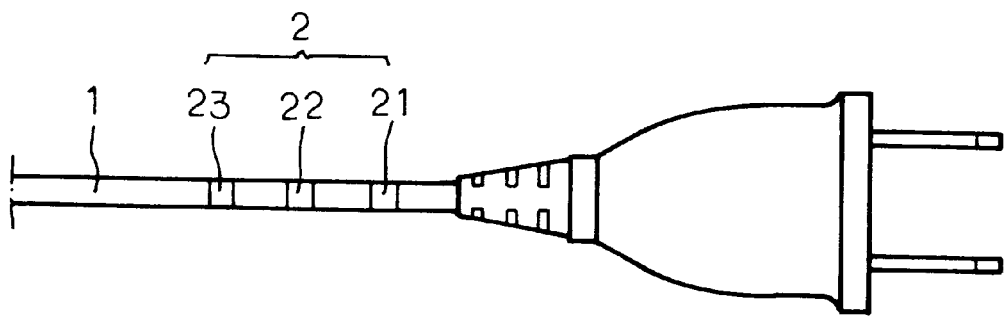
FIG. 5 is a schematic view of the fourth embodiment of fluorescent warning strip.

If the temperature keeps rising and the overload has not been removed, the third heat-sensing layer will become transparent as well, then the fluorescent warning strip 23 just as is shown in FIG. 5, in that time the PVC cord is about 80° C., the consumer must take a proper action to remove the factor of overload, otherwise the fire accident is going to happen.

After the overload or overheat status is eliminated, the temperature is getting down, the heat-sensing layer 3 will return to its original color from the transparent state to dark color to cover warning strip 2 again so that the warning device can be reused.

In conclusion, the warning device of overload or overheat for the electric cords, cables, sockets of the present invention can not only get rid of the disadvantage resided in the conventional electric cords, the present invention also possess the advantage of Simple Operation, Safety and Re-useable functions.

Having thus described advantages in present invention, what I claim as new and desire to be secured by the patent are:

1. A temperature warning device for electrical devices comprising:

at least one warning strip on an area of the electrical device that is subject to overheating, said warning strip is easily visible to a user of said warning device, and a temperature sensitive layer applied over said warning strip, said temperature sensitive layer obscures said warning strip so that said warning strip is not visible when said temperature sensitive layer is at room temperature, said temperature sensitive layer becomes transparent so that said warning strip is visible when a temperature of said temperature sensitive layer exceeds a selected temperature above room temperature; such that when the electrical devices are functioning properly, said warning strip is not visible, and when the electrical devices are heated above said selected temperature, said temperature sensitive layer becomes transparent so that said warning strip is visible, thereby alerting a user of said warning device of a dangerous condition.

2. The temperature warning device for electrical devices as claimed in claim 1 wherein:

a plurality of said warning strips are provided, each of said temperature sensitive layers covering said warning strips become transparent at a different temperature, so that advancing degrees of warning are provided to the user of said warning device.

3. The temperature warning device for electrical devices as claimed in claim 1 wherein:

when the electrical device is no longer overheated, said temperature sensitive layers lose their transparency so that said warning strips are not visible, thereby allowing said warning device to be used repeatedly.

4. The temperature warning device for electrical devices as claimed in claim 2 wherein:

when the electrical device is no longer overheated, said temperature sensitive layers lose their transparency so that said warning strips are not visible, thereby allowing said warning device to be used repeatedly.

* * * * *